Oct. 14, 1941.       G. G. SOMERVILLE ET AL       2,259,118
WELDING APPARATUS
Filed July 12, 1940          2 Sheets-Sheet 1
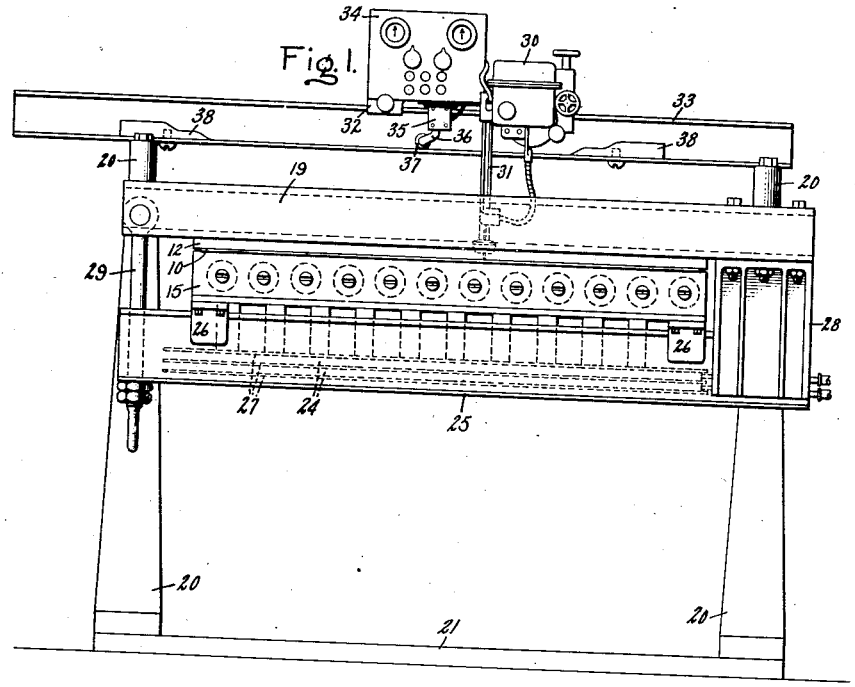
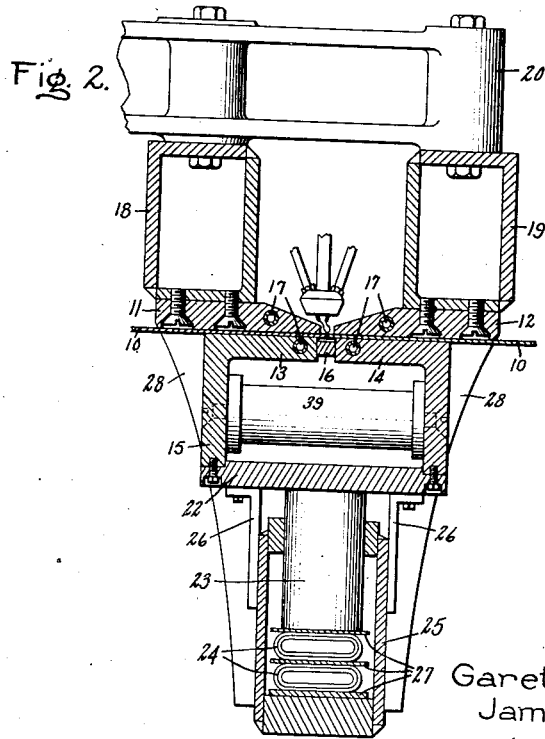
Inventors:
Gareth G Somerville,
James T. Catlett,
by Harry E. Dunham
Their Attorney.

Oct. 14, 1941.  G. G. SOMERVILLE ET AL  2,259,118
WELDING APPARATUS
Filed July 12, 1940  2 Sheets-Sheet 2
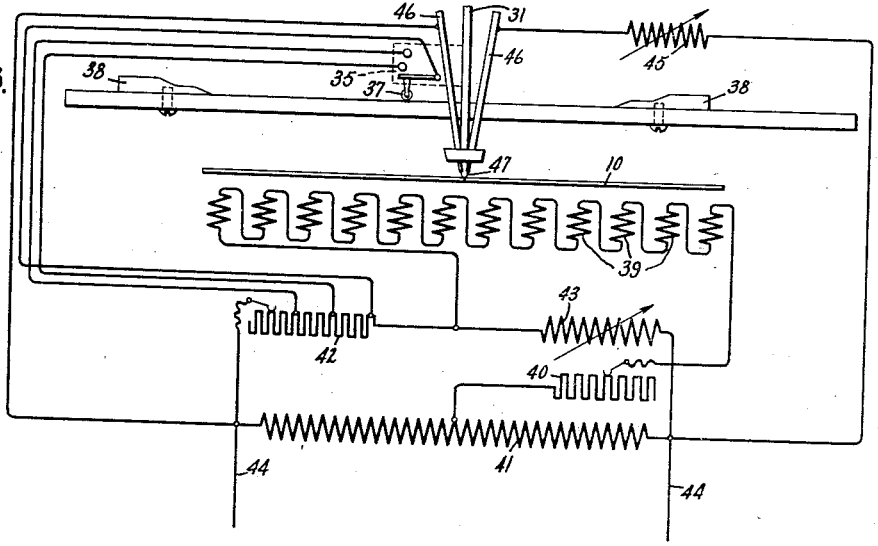
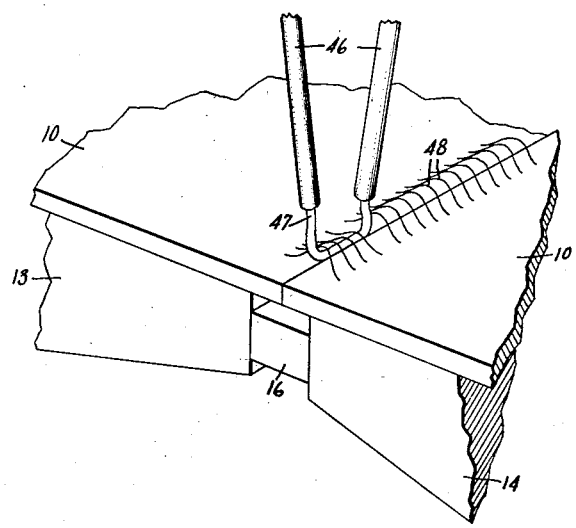
Inventors:
Gareth G. Somerville,
James T. Catlett,
by Harry E. Dunham
Their Attorney.

Patented Oct. 14, 1941

2,259,118

UNITED STATES PATENT OFFICE 2,259,118

WELDING APPARATUS

Gareth G. Somerville, Pittsfield, Mass., and James T. Catlett, Scotia, N. Y., assignors to General Electric Company, a corporation of New York Application July 12, 1940, Serial No. 345,226

20 Claims. (Cl. 219—8)

Our invention relates to a method of arc heating as well as to apparatus for practicing our method. More specifically, it relates to a method and apparatus for welding thin sheet material at high rates of speed with the atomic hydrogen flame. Although not limited thereto, our invention is particularly suited for welding silicon steel sheets such as are used in the magnetic circuits of electrical apparatus.

The butt welding of silicon steel has always been a difficult problem. This steel being high in silicon content and coated with a heavy layer of scale does not lend itself readily to resistance welding and heretofore every fusion welding process that has been tried has met with almost complete failure because of the distortion resulting from the excessive heat employed.

In making a fusion weld, the heat must be kept from running back into the sheets and producing unpermissible distortion at the seam. This has been accomplished by using alignment clamps which engage the sheets closely adjacent their edges and act at the same time as heat stops. With such clamps, however, it is possible to fuse the sheet edges with an oxy-acetylene flame only at low speeds for more heat is absorbed by the clamps than is needed to fuse the metal at the seam.

The atomic hydrogen arc with its extremely high temperature and other qualifications is an ideal source of heat for this purpose but to concentrate the atomic flame on a seam and hold the heat band to less than $\frac{1}{16}$" requires that the atomic arc travel down between the clamps and impinge on the edges of the sheets at the seam between them.

It is an object of our invention to provide a welding method and apparatus in which the arc of an atomic hydrogen torch is drawn down between closely spaced work clamps and held exactly on the seam between the plates positioned in these clamps.

From a broader viewpoint, it is also an object of our invention to stabilize an arc established between a plurality of electrodes through the use of a magnetic flux which acts on the arc after spanning a high reluctance gap directly under the seam between the parts being welded.

It is another object of our invention to control an arc by controlling the phase relationship of its current to that of an electromagnet whose flux is used for stabilizing and directing it.

Further objects of our invention will become apparent from a consideration of the following description taken in connection with the accompanying drawings in which Fig. 1 is a side view of an automatic atomic hydrogen welding machine embodying our invention; Fig. 2 is a cross-sectional view of the magnetic chill-bar forming a part thereof; Fig. 3 is a diagram illustrating the electrical circuits for the machine of Figs. 1 and 2; and Fig. 4 is a view illustrating the effect of the magnetic control on an arc established between electrodes whose arcing terminals are adjacent the seam to be welded.

In the machine illustrated in Figs. 1 and 2, the work parts 10 are supported on and clamped by jaws 11 and 12 to the pole pieces 13 and 14 of an electromagnet 15. These pole pieces are separated from one another by a high reluctance gap which is formed by a strip of non-magnetic material 16 which may be of copper or of a cupreous material. When welding thin material such as the sheets illustrated in the drawings, it has been found desirable to space strip 16 from the supporting surfaces of the pole pieces 13 and 14 so that the edges of the sheets at the seam between them do not engage this strip.

Pole pieces 13 and 14 of electromagnet 15 and clamping jaws 11 and 12 are closely spaced so as to secure a proper alignment of the sheet edges at the seam between them. These members are also cooled by passageways 17 through which a suitable cooling medium such as water is circulated. The uniform clamping and cooling of the sheet edges along their abutting edges is of considerable importance and generally the spacing of the jaws is such that the gap between them is about $\frac{1}{8}$" in width when welding sheets of from 10 to 30 mils in thickness.

Clamping jaws 11 and 12 are attached to box beams 18 and 19 which extend lengthwise of the machine and are attached at their ends to vertical frame members 20 which are mounted on a base 21. Pole pieces 13 and 14 of electromagnet 15 are attached to a non-magnetic member 22 which extends lengthwise of the machine and is supported on a plurality of cylinders 23, the lower ends of which rest upon superimposed sections of fire hose 24. The cylinders 23 extend into a beam 25 which also serves as a support for the sections of fire hose 24. Electromagnet 15 is also provided with brackets 26 which are attached at the ends of support member 22 and engage the outside walls of beam 25. These brackets serve to position electromagnet 15 relative to beam 25 supplementing in this manner the guiding influence of cylinders 23. It is to be noted that strips of material 27 are inserted between the sections of fire hose 24 and between these sections of fire hose and beam 25 as well as cylinders 23.

Beam 25 is located below and between beams 18 and 19. It is supported in a parallel position relative to beams 18 and 19 by brackets 28 attached at one end thereof and at the corresponding ends of beams 18 and 19. A latch 29 pivoted between beams 18 and 19 at the other end of these beams also acts when in position as a support for the other end of beam 25. Under certain circumstances as, for example, when welding cylindrical bodies, latch 29 may be swung up so as to clear the passageway between the ends of beams 18, 19 and 25 for the insertion and removal of work.

In the machine illustrated, the seam between sheets 10 is welded by means of an atomic hydrogen head 30 which is positioned over the seam so that the end of its nozzle member 31 is closely adjacent the seam. This welding head may embody the construction illustrated and described in the United States Letters Patent of one of us, No. 1,946,305—James T. Catlett, granted February 6, 1934.

Welding head 30 is supported on a carriage 32 which travels along a track 33 which is attached to members 20 of the machine so as to be substantially parallel to beams 18 and 19 also attached to these members. The travel carriage besides acting as a support for the welding head also embodies a control panel 34 and a switch 35 which is used for controlling the flux of electromagnet 15. This switch is provided with an operating arm 36 having a roller 37 which is adapted to engage cams 38 adjustably supported in predetermined positions along track 33. Thus, as carriage 32 and welding head 30 travel along the work switch 35 is operated by cams 38 at certain predetermined positions.

Electromagnet 15 is provided with a plurality of coils 39 which are located on cores extending between its pole pieces 13 and 14. As shown in Fig. 3, these coils are connected in series with one another and an adjustable resistance 40 across a phase shift circuit including an inductance 41, an adjustable resistance 42, and an adjustable inductance 43. This phase shift circuit is connected across a source of alternating current supply 44 which is also connected through an adjustable inductance 45 to the electrodes 46 of the automatic atomic hydrogen head.

The phase relationship of the current supplied to the electromagnet coils 39 and to the arc established between electrodes 46 of the atomic torch may be adjusted by adjusting the relative values of resistance 42 and inductance 43. Switch 35, when operated by cams 38 during the travel of the atomic torch relative to the work, also controls this phase relationship by short-circuiting portions of resistance 42. The particular switch illustrated has two positions and, in accordance with the two levels of cam 38, portions of the resistance 42 between its contacts are shortened when the torch approaches the ends of its travel along sheets 10.

The action of the electromagnet upon the atomic arc is illustrated in the diagrammatic view of Fig. 4. In the arrangement there illustrated, electrodes 46 are arranged on opposite sides of the seam between sheets 10 with their arcing terminals displaced in the direction of the seam in order to obtain the stabilizing effect described and claimed in the above-named Letters Patent No. 1,946,305. The arc established between these electrodes is represented at 47. A representation has also been made of the flux lines 48 which arch across the seam and interlink arc 47.

When the left-hand electrode 46 is positive and the electromagnet energized so that flux is supplied from pole piece 13 through the left-hand sheet 10 across the seam and through the right-hand sheet 10 to the pole piece 14, it will be noted that the flux 48 arched across the seam gap interlinks the arc in the same direction as the self-generated flux inside the arc loop. The arc being an electrical conductor is acted on by this flux in such a manner that its central portion is attracted to the seam and aligned therewith as illustrated in Fig. 4. This magnetic flux not only acts to pull the arc down to the seam but also acts on the central portion of the arc to move it in a lateral direction until it is positioned immediately over the seam. This is exactly where it is desired to generate the greatest amount of atomic hydrogen and heat and without the control of the electromagnet and its flux it would not be possible to hold the arc on the seam consistently and travel at the high speeds desired. With this control, it is possible to hold the heat band to less than $\tfrac{1}{16}''$ when the work clamps come within $\tfrac{1}{8}''$ to $\tfrac{3}{16}''$ of each other. As pointed out above, it is quite essential that the clamp edges contact the work close to the seam since the heat from welding must not be allowed to travel back into the sheet if proper seam alignment between the sheets is to be maintained.

It is apparent, of course, that if the direction of magnetic flux arched across the seam and interlinking the arc is reversed from that considered above, the arc will be blown away from the seam rather than being drawn to it. Thus, the phase relationship of the flux relative to the current flowing in the arc may be employed for controlling its heating effect. This method of control lends itself readily to the use of limit switches such as illustrated in the drawings where by proper phase shift full heat is not applied at the beginning and end of a weld in order to prevent a notching effect at the ends of the welds due to the surface tension of the liquid metal formed during welding. Additional heat control can be obtained by controlling the intensity of the flux through an adjustment of resistor 40 in Fig. 3 or by changing the setting of reactor 45 in order to control the amount of current supplied to the arc.

Instead of positioning electrodes 46 as shown in Fig. 4, they may be positioned in a common plane which preferably should be so directed as to extend in the direction of the seam so that the middle portion of the arc loop is directed along it. Other arrangements of electrodes may be used to position an arc established between them adjacent the work on which it acts.

When welding magnetic material such as the silicon sheets above referred to, the flux traveling through the sheet edges automatically arches over the seam where it is required for drawing the arc down between the work clamps and holding it exactly on the sheets edges. Alignment of the seam with the travel of the arc need not consequently be very accurate. The application of our invention, however, is not limited to the welding of sheets of magnetic material. When using sheets of non-magnetic material such as copper, aluminum and the like, it is necessary, however, to line up the seam to be welded directly over the pole gap of the electromagnet so that the arc will be drawn to the non-magnetic material at the desired spot. Consequently, non-magnetic material requires somewhat more care in alignment and in adjustment than does magnetic material for with a non-magnetic material the arc has for a target not the sheet edges but some intangible spot just below the sheet edges.

Although it is possible to produce welds in both ferrous and non-ferrous materials with slightly lapped edges, it has been found that such a practice does not produce the smooth surface welds obtained by simply butting together the edges of the material. In butting together material of from 10 to 15 mils in thickness, a gap of from 5 to 7 mils is as much as can be consistently bridged by a weld when the sheets are held so that they cannot move. The shrinking of the molten weld metal as a weld progresses along a seam is well understood and this action can be used to advantage when employing our apparatus. If the clamp pressure is so adjusted as to firmly hold the sheets yet permit creeping of the sheets during welding, it is possible to span a much greater initial gap than 5 to 7 mils. When using this principle, however, the weld must be started with the sheet edges in contact so as to provide a fulcrum about which the weld can shrink and pull the welded edges together. Care must be exercised in the shearing of the sheets prior to welding to provide square unbroken edges.

Under certain circumstances, it may prove desirable to anneal the weld after it has been made and this can be accomplished by traversing the atomic torch over the weld at the desired rate of speed. Silicon steel containing 5 per cent silicon is very brittle and when welded at speeds of 100 or more inches per minute, the cooling of the weld from the molten state is so fast that enormous stresses are set up in the weld. If the weld is left in this highly stressed state, it is more brittle than the sheets themselves. However, by reheating the weld to a red heat, these stresses may be relieved to such an extent that upon bending failure seldom occurs in the weld.

Our invention is particularly suited for joining silicon steel sheets into long strips from which laminations for magnetic core circuits are stamped. It is also valuable for joining such sheets into strips which are to be rolled or passed through an annealing furnace in a continuous ribbon. Our invention may, of course, be applied wherever it is desirable to weld thin sheets of material at high rates of speed. Excellent results are obtained with the atomic hydrogen torch but our invention is obviously not limited thereto since our method and apparatus may be used for controlling arcs established between electrodes whose arcing terminals are positioned close enough to a work part to permit the magnetic flux which passes through the work to act thereon and control it.

Other forms of electromagnet than that illustrated may be employed for generating the magnetic field which is directed through the arc loop and enters and leaves the work parts from opposite sides thereof. In fact, the magnetic field about a conductor extending lengthwise of the seam may be employed since it will arch across the seam in the desired manner to control the welding arc established between a plurality of electrodes. Instead of the separate excitation of the electromagnet illustrated and described above, it is apparent that by a direct connection or through the agency of a series transformer, this electromagnet may be connected in the welding circuit and, consequently, have a field whose intensity varies with variations in the flow of welding current. Furthermore, the output terminals of a current transformer so used may be connected to the winding of the electromagnet through an autotransformer in order to provide an adjustment for the electromagnet which does not materially change the current supplied to the arc. When a different form of electromagnet or a conductor is employed for generating the controlling field, it is, of course, desirable to provide phase shift means for controlling the phase relationship between the current flowing in the arc and the field established by the electromagnet or conductor.

It is also apparent that our invention is not limited to the use of alternating current arcs and alternating magnetic fields since a direct current magnet field may be used for controlling a direct current arc or an alternating current arc. An alternating current arc with a direct current field, or vice versa, will result in an alternate attraction and repulsion of the arc toward and from the work. Under certain conditions of welding, this may be quite desirable. It is also apparent that heat controlled through phase shift is not limited to the prevention of notching at the ends of a weld but may be used for securing any desired heat control. Other forms of phase shifters may be used instead of the one illustrated in Fig. 3. Many other variations and modifications will occur to those skilled in the art in view of the above description and we, consequently, intend in the appended claims to cover all such modifications and variations.

What we claim as new and desire to secure by Letters Patent of the United States, is:

1. Apparatus comprising means including a plurality of electrodes for establishing an arc loop, means for traversing a work part and said electrodes relatively to one another along a predetermined path, means for positioning said electrodes relatively to one another and said work part so that the middle portion of said arc loop is adjacent said work part and directed along said predetermined path, and means for generating a magnetic field which is directed through said arc loop and enters and leaves said work part from opposite sides of said predetermined path.

2. Welding apparatus comprising means for positioning work pieces with their adjacent edges forming a seam to be welded, means for establishing an arc between electrodes whose arcing terminals are positioned adjacent one another and said seam, and means for generating a magnetic field which enters and leaves the adjacent edges of said work pieces and crosses said seam at the gap between said work pieces and the arcing terminals of said electrodes.

3. Welding apparatus comprising means for positioning a plurality of sheets with their adjacent edges forming a seam to be welded, means for establishing an arc loop between electrodes whose arcing terminals are positioned adjacent one another and said seam, means for positioning said electrodes relatively to one another and said seam so that the middle portion of said arc loop is directed along said seam, and means for generating a magnetic field which passes through the edges of said sheets and about the middle portion of said arc loop.

4. Welding apparatus comprising means for positioning a plurality of sheets with their adjacent edges forming a seam to be welded, means for establishing an arc between electrodes whose arcing terminals are positioned adjacent one another and said seam, and means for generating a magnetic field which passes from one sheet edge to the other at said seam and interlinks the arc established between said electrodes.

5. Welding apparatus comprising electrodes positioned relative to one another so that an arc established between their arcing terminals is blown out into the form of a loop by the self-generated magnetic field of the current flowing in said arc, means for positioning said electrodes relatively to one another and a work part so that the middle portion of said arc loop is adjacent and extends along the path of welding, and means for generating and directing through said work part and across said path of welding from one side thereof to the other a magnetic field which reinforces the self-generated field within said arc loop.

6. Welding apparatus comprising means for clamping sheets of magnetic material with their adjacent edges opposite one another to form a seam to be welded, means for establishing an arc between electrodes whose arcing terminals are positioned adjacent one another and said seam, means for establishing a magnetic circuit directed through said sheet edges at said seam, and means for generating in said magnetic circuit a field of sufficient intensity to arch out at said seam toward the arcing terminals of said electrodes.

7. Welding apparatus comprising means for clamping a plurality of sheets with their adjacent edges forming a seam to be welded, means for establishing an arc loop between electrodes whose arcing terminals are positioned relatively to one another and said seam so that the middle portion of said arc loop is directed along said seam, means for traversing said sheets and said electrodes relatively to one another along said seam, means including an electromagnet for directing a magnetic field through said arc loop and across said seam from one sheet edge to the other, means for supplying alternating current of the same frequency to said electrodes and to said electromagnet, and means for automatically controlling the phase relation of the current supplied to said electromagnet and to said arc in accordance with the position of said arc along said seam.

8. Welding apparatus comprising means for positioning work parts with their adjacent edges forming a seam to be welded, means for establishing an alternating current arc between electrodes whose arcing terminals are positioned adjacent one another and said seam so that the middle portion of said arc is directed along said seam, means for generating an alternating magnetic field of the same frequency as the arc current, means for directing said field through the seam edges of said work parts and across the gap between said seam and the arcing terminals of said electrodes, and means for controlling the phase displacement between said arc current and said magnetic field.

9. Welding apparatus comprising means for positioning work parts with their adjacent edges forming a seam to be welded, means for establishing an alternating current arc between electrodes whose arcing terminals are positioned adjacent one another and said seam so that the middle portion of said arc is directed along said seam, means for generating an alternating magnetic field of the same frequency as the arc current, means for directing said field through the seam edges of said work parts and across the gap between said seam and the arcing terminals of said electrodes, means for traversing said work parts and said electrodes relatively to one another along said seam, and means for controlling the phase relationship of said magnetic field and the current in said arc in accordance with the position of said arc along said seam.

10. Arc welding apparatus comprising electromagnetic means for controlling the effect of a welding arc on the work, means for supplying alternating current of the same frequency to said electromagnet and to said arc, and means for adjusting the out-of-phase relationship of the alternating currents supplied to said electromagnet and to said arc by said last mentioned means in order to control the direction and amount of deflection of said arc relative to the work.

11. Arc welding apparatus comprising electromagnetic means for controlling a welding arc, means for supplying alternating current of the same frequency to said electromagnet and to said arc, means for traversing said arc and a work part relative to one another, means for controlling the phase relationship of the currents supplied to said electromagnet and to said arc, and means for setting said controlling means to predetermine a particular variation in said phase relationship in accordance with the position of said arc relative to said work part.

12. Welding apparatus comprising electromagnetic means for controlling an arc established between a plurality of electrodes, means for supplying alternating current of the same frequency to said electromagnetic means and to said arc, means for traversing said arc and a work part relative to one another, and means responsive to said traversing means for automatically controlling the phase relationship between the currents supplied to said electromagnetic means and to said arc.

13. Welding apparatus comprising means for uniformly clamping and cooling a pluraltiy of sheets along their abutting edges which form the seam to be welded, means for establishing an arc the middle portion of which is directed along said seam between said clamping means, and means for generating and directing through the abutting edges of said sheets and across the gap between said clamping means a concentration of magnetic flux which interlinks and controls the alignment of said middle portion of said arc loop with said seam and its spacing relative thereto.

14. Welding apparatus comprising a gas-arc torch in which gas is supplied about and across an arc loop established between the arcing terminals of a plurality of electrodes, means including the pole pieces of an electromagnet and oppositely disposed non-magnetic jaws for uniformly clamping and conducting heat from the seam edges of work parts located therebetween, means for positioning the arcing terminals of the electrodes of said torch relative to one another to direct the middle portion of said arc loop along the gap between said jaws, and means for exciting said electromagnet to generate a magnetic field which passes from one pole piece to the other across the gap between said jaws.

15. Welding apparatus comprising a gas-arc torch in which gas is supplied about and across an arc loop established between the arcing terminals of a plurality of electrodes, means including the pole pieces of an electromagnet and oppositely disposed non-magnetic jaws for uniformly clamping and conducting heat from the seam edges of work parts located therebetween, means for traversing said gas torch and said clamping and heat conducting means relative to one another with said arc loop between said jaws, and means for exciting said electromagnet to generate a magnetic field which passes from one pole piece to the other across the gap between said jaws.

16. Welding apparatus comprising a gas-arc torch in which gas is supplied about and across an arc loop established between the arcing terminals of a plurality of electrodes, means including the pole pieces of an electromagnet and oppositely disposed non-magnetic jaws for uniformly clamping and conducting heat from the seam edges of work parts located therebetween, means for traversing said gas torch and said clamping and heat conducting means relative to one another with said arc loop positioned between said jaws, means for supplying alternating current of the same frequency to said arc loop and to said electromagnet, and means for automatically controlling the phase relationship of the current supplied to said arc loop and to said electromagnet in accordance with the position of said arc loop along said jaws.

17. Welding apparatus comprising a gas-arc torch in which gas is supplied about and across an arc loop established between the arcing terminals of a plurality of electrodes, means including the pole pieces of an electromagnet and oppositely disposed non-magnetic jaws for uniformly clamping and conducting heat from the seam edges of work parts located therebetween, means for traversing said gas torch and said clamping and heat conducting means relative to one another with said arc loop positioned between said jaws, means for positioning the arcing terminals of the electrodes of said torch relative to one another to direct the middle portion of said arc loop along the gap between said jaws, means for supplying alternating current of the same frequency to said arc loop and to said electromagnet, and means for automatically controlling the phase relationship of the current supplied to said arc loop and to said electromagnet in accordance with the position of said arc loop along said jaws.

18. The method of arc heating which comprises establishing an arc loop between a plurality of electrodes, positioning said electrodes relative to a work part so that said arc loop is adjacent thereto and linking said arc loop with a magnetic field which enters and leaves said work part on opposite sides of said arc loop.

19. The method of arc welding which comprises positioning work parts with their edges forming a seam to be welded, traversing along one side of said seam an arc loop whose middle portion is directed along said seam, providing a high reluctance gap along the opposite side of said seam and controlling the spacing and alignment of the middle portion of said arc loop relative to said seam by directing a magnetic flux across said gap and through the edges of said work parts at said seam.

20. The method of arc welding which comprises positioning work parts with their edges forming a seam to be welded, applying heat to one side of said seam by means of an arc established between a plurality of electrodes providing a high reluctance gap along the opposite side of said seam, directing a magnetic flux across said gap and through the edges of said work parts at said seam, and controlling the phase relationship between said flux and the current in said arc.

GARETH G. SOMERVILLE.
JAMES T. CATLETT.